United States Patent
Kim et al.

(10) Patent No.: US 10,334,150 B2
(45) Date of Patent: Jun. 25, 2019

(54) CAMERA SYSTEM AND METHOD OF TRACKING OBJECT USING THE SAME

(71) Applicant: HANWHA TECHWIN CO., LTD., Changwon-si (KR)

(72) Inventors: Kyunghyun Kim, Changwon-si (KR); Daesung Kim, Changwon-si (KR); Jongin Park, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 184 days.

(21) Appl. No.: 14/712,039

(22) Filed: May 14, 2015

(65) Prior Publication Data

US 2015/0334356 A1   Nov. 19, 2015

(30) Foreign Application Priority Data

May 14, 2014   (KR) .................. 10-2014-0057948
Jan. 30, 2015   (KR) .................. 10-2015-0015574

(51) Int. Cl.
*H04N 7/18*   (2006.01)
*H04N 5/232*   (2006.01)

(52) U.S. Cl.
CPC ......... *H04N 5/232* (2013.01); *H04N 5/23219* (2013.01); *H04N 5/23296* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 8,280,108 B2 | 10/2012 | Takeuchi | |
| 9,552,642 B2 | 1/2017 | Heu et al. | |
| 9,729,835 B2 | 8/2017 | Rehn et al. | |
| 2002/0030741 A1* | 3/2002 | Broemmelsiek | G01S 3/7864 348/169 |
| 2005/0128291 A1* | 6/2005 | Murakami | H04N 7/181 348/143 |
| 2006/0164423 A1* | 7/2006 | Lee | H04N 3/1562 345/474 |
| 2008/0100709 A1* | 5/2008 | Furukawa | G01S 3/7865 348/169 |

(Continued)

FOREIGN PATENT DOCUMENTS

| | | |
|---|---|---|
| CN | 101615295 A | 12/2009 |
| CN | 101699862 A | 4/2010 |

(Continued)

OTHER PUBLICATIONS

Communication dated Dec. 27, 2018, issued by the State Intellectual Property Office of P.R. China in counterpart Chinese Application No. 201510245931.2.

*Primary Examiner* — Kaitlin A Retallick
(74) *Attorney, Agent, or Firm* — Sughrue Mion, PLLC

(57) ABSTRACT

Provided is a camera system capable of detecting and tracking an object. The camera system includes: a camera configured to detect at least one object in a surveillance region of which an image is captured by the camera directed in a first direction and generate metadata of the object; and a camera controller configured to control at least one of panning, tilting and zooming of the camera based on the metadata of a target object selected from among the at least one object.

18 Claims, 10 Drawing Sheets

(56) References Cited

U.S. PATENT DOCUMENTS

| | | | |
|---|---|---|---|
| 2008/0129825 A1* | 6/2008 | DeAngelis | A63B 24/0021 348/169 |
| 2008/0158361 A1* | 7/2008 | Itoh | G08B 13/19602 348/155 |
| 2009/0316955 A1* | 12/2009 | Takeuchi | G06T 7/20 382/103 |
| 2014/0022351 A1 | 1/2014 | Cho et al. | |
| 2014/0092268 A1 | 4/2014 | Cleveland | |
| 2014/0193034 A1* | 7/2014 | Oami | G06K 9/00362 382/103 |
| 2014/0320702 A1* | 10/2014 | Tsubusaki | H04N 5/23296 348/240.3 |

FOREIGN PATENT DOCUMENTS

| | | |
|---|---|---|
| CN | 103024276 A | 4/2013 |
| CN | 103369237 A | 10/2013 |
| CN | 103456003 A | 12/2013 |
| CN | 103581543 A | 2/2014 |
| CN | 103581614 A | 2/2014 |
| CN | 103679744 A | 3/2014 |
| KR | 10-2008-0045318 A | 5/2008 |
| KR | 10-1019259 B1 | 3/2011 |
| KR | 10-2013-0039844 A | 4/2013 |

\* cited by examiner

CAMERA SYSTEM AND METHOD OF TRACKING OBJECT USING THE SAME

CROSS-REFERENCE TO THE RELATED APPLICATIONS

This application claims priority from Korean Patent Application No. 10-2014-0057948, filed on May 14, 2014, and Korean Patent Application No. 10-2015-0015574, filed on Jan. 30, 2015, in the Korean Intellectual Property Office, the disclosures of which are incorporated herein in their entirety by reference.

BACKGROUND

1. Field

Apparatuses and methods consistent with exemplary embodiments relate to a camera system capable of detecting and tracking an object.

2. Description of the Related Art

The function of automatic tracking is to detect a moving object in images obtained by a camera by using an image analyzing processor and continuously track the moving object by panning/tilting/zooming the camera.

SUMMARY

Exemplary embodiments provide a camera system capable of panning/tilting/zooming a camera without analyzing images using a digital signal processor (DSP), thereby saving costs.

Various aspects will be set forth in part in the description which follows and, in part, will be apparent from the description, or may be learned by practice of the presented embodiments.

According to one or more exemplary embodiments, there is provided a camera system which may include: a camera configured to detect at least one object in a surveillance region of which an image is captured by the camera directed in a first direction and generate metadata of the object; and a camera controller configured to control at least one of panning, tilting and zooming of the camera based on the metadata of a target object selected from among the at least one object.

The metadata may include a coordinate of the at least one object.

The camera controller may calculate a size and a center coordinate of the at least one object from the metadata generated by the camera while the camera is maintained in the first direction without being moved, and may calculate vector information about the at least one object from variations of the center coordinate of the at least one object.

The vector information may include a travel distance, a travel direction, and a velocity of the object.

The camera controller may is configured to control at least one of panning and tilting of the camera with respect to only the target object among the at least one object by comparing size and vector information about the target object with size and vector information about another object among the at least one object.

The camera controller may select one of the at least one object having a preset size as the target object.

The camera controller may set a first region in the image captured by the camera directed in the first direction, and if the target object departs from the first region, the camera controller may control at least one of panning and tilting of the camera to direct the camera in a second direction toward the target object.

The camera controller may control zooming of the camera such that a size of the target object in an image captured by the camera directed in the second direction is equal to a size of the target object in the image captured by the camera directed in the first direction.

The camera controller may set a second region for the target object based on a velocity of the target object, and may control at least one of panning and tilting of the camera with respect to only the target object among the target object and at least one object existing outside the second region by removing metadata obtained outside the second region.

The camera controller may control at least one of panning and tilting of the camera with respect to only the target object among the target object and another object existing in the second region besides the target object by comparing size and vector information about the other object with size and vector information about the target object.

According to one or more exemplary embodiments, there is provided a method of tracking an object using a camera which may include: generating metadata about at least one object using a camera, the object being detected in a surveillance region of which an image is captured by the camera directed in a first direction; selecting a target object from among the at least one object based on the metadata analyzed by a camera controller; and generating a control signal based on the metadata of the target object to control at least one of panning, tilting and zooming of the camera.

The metadata may include a coordinate of the at least one object.

The generating the control signal may include: calculating a size and a center coordinate of the at least one object from the metadata generated by the camera while the camera is maintained in the first direction without being moved; and calculating vector information about the at least one object from variations of the center coordinate of the at least one object.

The vector information may include a travel distance, a travel direction, and a velocity of the object.

The generating the control signal may include generating a control signal to control at least one of panning and tilting of the camera with respect to only the target object among the at least one object by comparing size and vector information about the target object with size and vector information about another object among the at least one object.

The selecting the target object may include selecting one of the at least one object having a preset size as the target object.

The generating the control signal may include: setting a first region in the image captured by the camera directed in the first direction; and if the target object departs from the first region, controlling at least one of panning and tilting of the camera to direct the camera in a second direction toward the target object.

The generating the control signal may include generating a control signal to control zooming of the camera such that a size of the target object in an image captured by the camera directed in the second direction is equal to a size of the target object in the image captured by the camera directed in the first direction.

The generating the control signal may include: setting a second region for the target object based on a velocity of the target object; and generating a control signal to control at least one of panning and tilting of the camera with respect to only the target object among the target object and at least one object existing outside the second region by removing metadata obtained outside the second region.

The generating the control signal may include generating a control signal to control at least one of panning and tilting of the camera with respect to only the target object among the target object and another object existing in the second region besides the target object by comparing size and vector information about the target object with size and vector information about the other object.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
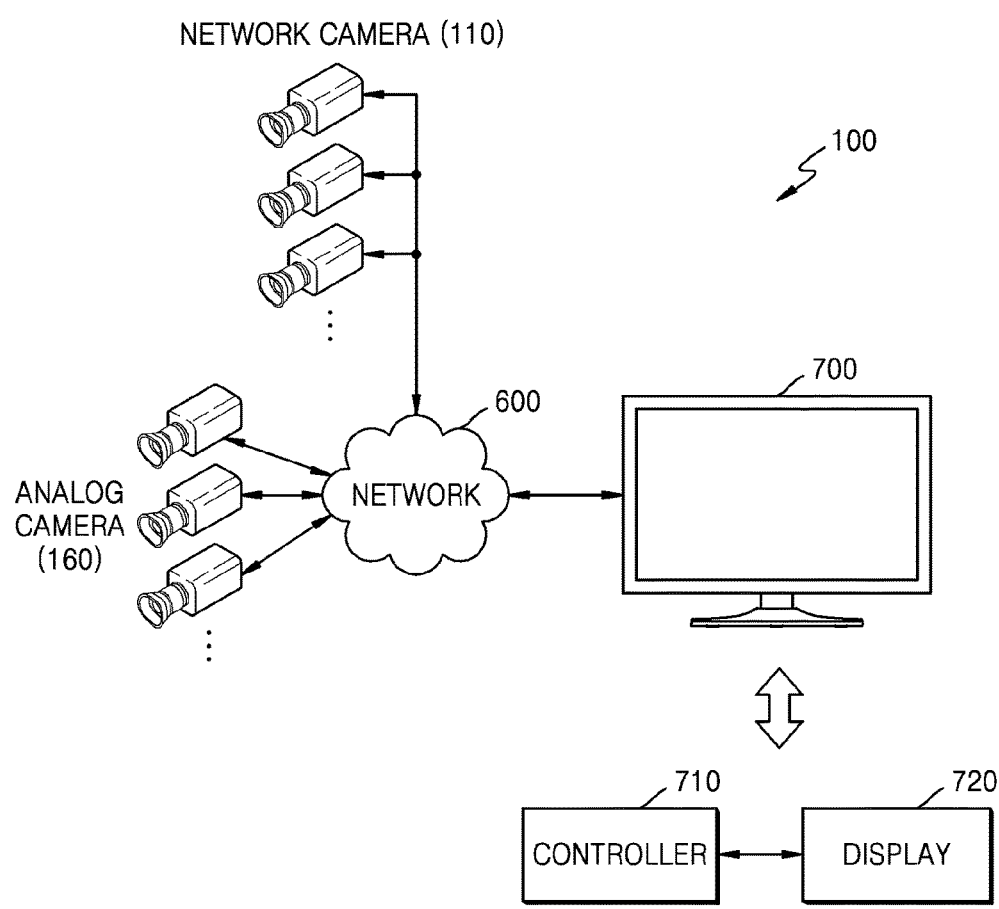
FIG. 1 is a view illustrating a camera and control system according to an exemplary embodiment.

Reference will now be made in detail to exemplary embodiments, which are described herein with reference to the accompanying drawings. The exemplary embodiments may have different forms and should not be construed as being limited to the descriptions set forth herein. Accordingly, the exemplary embodiments are merely described below, by referring to the figures, to explain various aspects of the inventive concept. As used herein, the term "and/or" includes any and all combinations of one or more of the associated listed items. Expressions such as "at least one of," when preceding a list of elements, modify the entire list of elements and do not modify the individual elements of the list. Moreover, detailed descriptions related to well-known functions or configurations may be omitted in order not to unnecessarily obscure subject matters of the exemplary embodiments.

It will be understood that although the terms "first" and "second" are used herein to describe various elements, these elements should not be limited by these terms. Terms are only used to distinguish one element from other elements.

In the following descriptions of the exemplary embodiments, the technical terms are used only for explaining a specific exemplary embodiment while not limiting the inventive concept. The meaning of 'include' or 'comprise' specifies a property, a fixed number, a step, a process, an element, a component, and a combination thereof but does not exclude other properties, fixed numbers, steps, processes, elements, components, and combinations thereof.

The exemplary embodiments may be embodied as functional blocks and various processing operations. The functional blocks may be implemented with various hardware and/or software configurations executing specific functions. For example, these blocks may employ integrated circuit configurations such as a memory, a processing unit, a logic unit, a look-up table and the like capable of executing various functions upon control of microprocessors or other control devices. In a similar manner to that in which the elements of the exemplary embodiments can be executed with software programming or software elements, the exemplary embodiments may be implemented with a scripting language or a programming language such as C, C++, Java, assembler, and the like, including various algorithms implemented by a combination of data structures, processes, routines or other programming configurations. The functional aspects may be implemented by algorithms executed in one or more processors. Also, the exemplary embodiments may employ conversional arts to establish an electronic environment, process signals and/or process data. Terms such as "mechanism," "element," "means," and "configuration" may be widely used and are not limited to mechanical and physical configurations. Such terms may have the meaning of a series of routines of software in association with a processor or the like.

In the drawings, like reference numerals denote like elements, and overlapping descriptions thereof will be omitted.

FIG. 1 is a view illustrating a camera and control system, according to an exemplary embodiment.

Referring to FIG. 1, the camera and control system of the present exemplary embodiment may include a camera array 100, and a central management unit 700 including a controller 710 and a display 720. The camera array 100 may be connected to the central management unit 700 through a wired or wireless network 600.

The camera array 100 may continuously photograph scenery within its angle of view while making preset panning/tilting/zooming motions, and may detect and track a plurality of objects appearing within the angle of view.

The camera array 100 may include at least one network camera 110 and at least one analog camera 160 which capture respective images. The network camera 110 may include a digital video recorder (DVR) or a network video recorder (NVR) for storing images. The analog camera 160 may include an encoder to encode images. However, the camera array 100 is not limited to the foregoing descriptions. For example, the camera array 100 may be any apparatus capable of transmitting images to the central management unit 700 through the network 600.

The central management unit 700 may receive images and metadata related to the images from the camera array 100 through the network 600. The images and metadata generated according to object detection and tracking operations may be transmitted from the camera array 100 to the central management unit 700.

The central management unit 700 may display the images received from the camera array 100, and may monitor the images. The central management unit 700 may control the camera array 100 based on results of the object detection and tracking operations performed by the camera array 100 and analysis of images captured by the camera array 100.

The controller 710 may control the central management unit 700 and may display control states on the display 720.

According to the present exemplary embodiment, the controller 710 may include a digital signal processor (DSP) or an image analyzer (not shown) so as to detect events from the images received from the camera array 100 through the network 600. The controller 710 may analyze the images received from the camera array 100, and if preset event conditions are satisfied, the controller 710 may generate an event.

Figure 2:
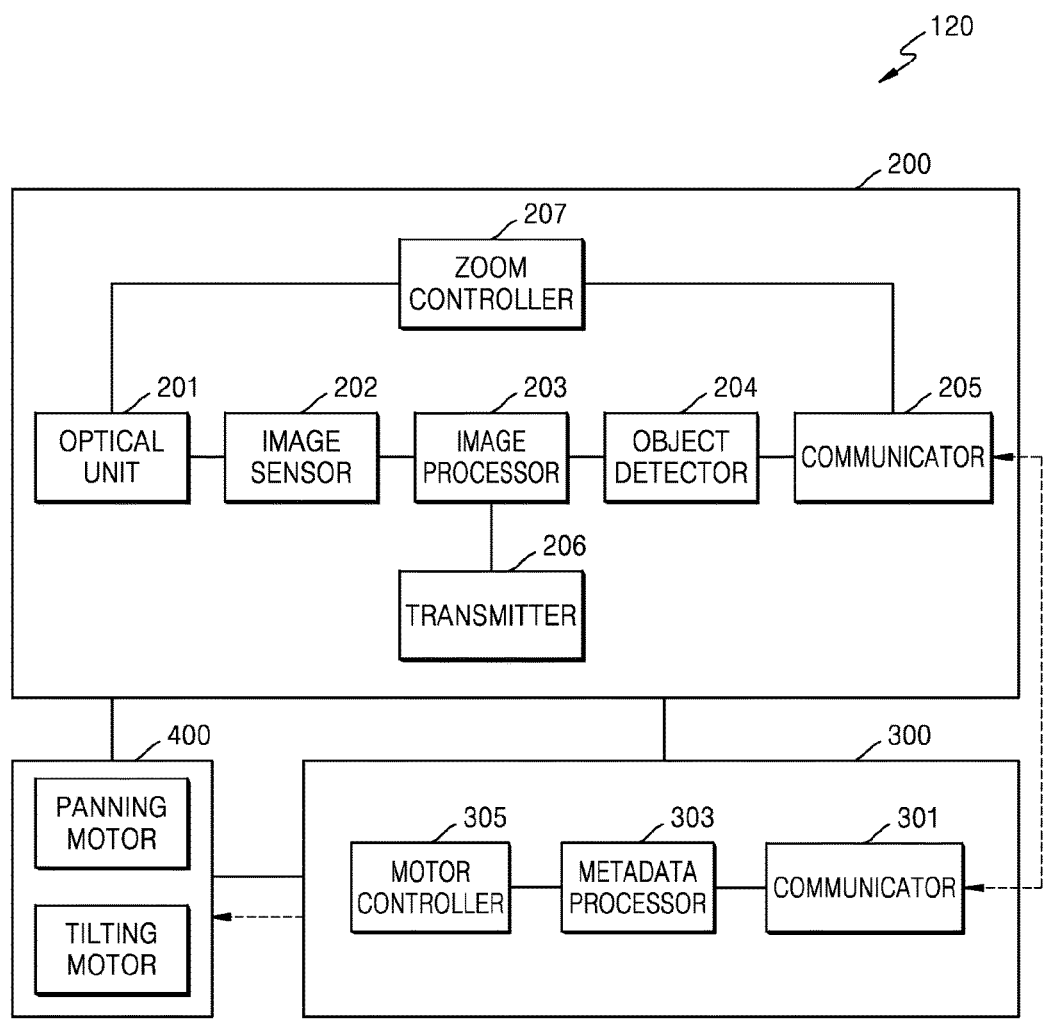
FIG. 2 is a block diagram schematically illustrating a camera system according to an exemplary embodiment.

FIG. 2 is a block diagram schematically illustrating a structure of a camera system, according to an exemplary embodiment.

Referring to FIG. 2, a camera system 120 may include a camera 200, a camera controller 300, and a panning/tilting motor 400. The camera 200 may be a camera included in the camera array 100. The camera controller 300 may be included in the camera 200 itself, according to an exemplary embodiment.

The camera system 120 may be integrally disposed on an outside or inside wall of a building such as an office building, a house, or a hospital building as well as a bank building or a public building requiring security, for the purpose of entrance and exit control or crime prevention. The camera 200 constituting the camera system 120 may take various shapes such as a straight shape or a dome shape according to an installation location or purposes of the camera system 120.

The camera 200 may include an optical unit 201, an image sensor 202, an image processor 203, an object detector 204, a communicator 205, a transmitter 206, and a zoom controller 207. The camera 200 may be disposed in a first housing (not shown), and some elements of the camera 200 may protrude outward from the first housing for capturing images.

The optical unit 201 may include a zoom lens, a focus lens, and an optical system such as an iris controlling an amount of light.

The image sensor 202 converts light that has passed through the optical unit 201 into an electric image signal. The image sensor 202 includes an image pickup device such as a charge coupled device (CCD) or a complementary metal oxide semiconductor (CMOS) device.

The image processor 203 performs an image processing process. For example, the image processor 203 removes noise from a digital image signal that is received from the image sensor 202 or converted from an analog signal received from the image sensor 202. Thereafter, the image processor 203 may transmit the processed digital image signal to the object detector 204 and the transmitter 206. In this case, the image processor 203 may output the processed digital image signal directly or after converting the processed digital image signal into an analog image signal.

The object detector 204 may detect objects from an image signal (hereinafter referred to as an "image") received from the image processor 203. For example, the object detector 204 may detect a local movement of an object based on a difference between a reference image and a current image captured by the camera 200 directed in one direction. The reference image may be an image captured at the moment when a motion detection function is activated to detect an object. The camera 200 being directed in one direction may include a situation in which the camera 200 is fixed at a given location without changing a panning/tilting/zooming condition. The current image may be an image captured after the reference image is determined. The reference image and the current image may be determined depending on an angle of view of the camera 200. The object detector 204 may detect an object by simply comparing the reference image and the current image that are obtained when the camera 200 is directed in the same direction. In the present exemplary embodiment, when the object detector 204 detects a local movement of an object, the object detector 204 is not limited to using the above-described method in which a difference between images is used. For example, various methods known in the related art may be used.

The object detector 204 may generate metadata containing results of the object detection. The metadata may include the number and the coordinates of objects detected at least from the current image. A coordinate of each object may include a coordinate of an upper-left end of an object block and a coordinate of a lower-right end of the object block.

The communicator 205 transmits the metadata to the camera controller 300.

The transmitter 206 may receive the image output from the image processor 203 and transmit the image to the controller 710 which may be disposed at a remote location.

The zoom controller 207 may generate a zoom control signal based on a zooming amount received from the camera controller 300 to control the zoom lens and the focus lens of the optical unit 201 for zooming (zooming-in or zooming-out) the camera 200.

In a method of detecting and tracking an object by capturing images using a camera and transmitting the images to a DSP or an image analyzer, the posture of the camera is determined based on image analysis performed by the DSP. For example, a global movement caused by a movement of the camera and a local movement of an object may both be contained in images. That is, if a camera is moved, it may be detected as if the whole scenery moves. The DSP may calculate a global movement between a previous image and a current image that are sequentially input to the DSP at regular time intervals, and may generate a compensated previous image by reflecting the calculated global movement. Then, the DSP may detect an object by extracting characteristic features (for example, brightness information, color information, edge information, or position information) between the compensated previous image and the current image. That is, since the DSP detects a global movements the DSP has a heavy calculation load, and if a high-performance DSP is used for real-time detection, costs increase.

According to the present exemplary embodiment, the camera controller 300 detects only local movements of objects simply detecting a change between a reference image and a current image. That is, the camera controller 300 may track an object by using only metadata of objects without analyzing images, for example, without determining motion vectors of the object, extracting characteristic features and compensating images to detect a global movement in an image. Local movements of objects are detected with a relatively low amount of calculation by using images captured by the camera 200 maintained at a set posture, and metadata is generated using a result of the object detection. Then, the metadata is transmitted to the camera controller 300 instead of transmitting images to the camera controller 300. The camera controller 300 may analyze and process the metadata, and control the posture of the camera 200 based on a result of the analysis and processing. Therefore, the camera 200 of the present exemplary embodiment may track an object in real time with a relatively low amount of calculation and a short processing time at low costs.

The camera controller 300 may be disposed in the first housing or a second housing (not shown) coupled to the first housing. The camera controller 300 may control panning/tilting/zooming of the camera 200, that is, the posture of the camera 200.

The camera controller 300 may include a communicator 301, a metadata processor 303, and a motor controller 305.

The communicator 301 may be connected to the communicator 205 of the camera 200 through a serial port and may receive metadata of objects from the communicator 205 of the camera 200.

The metadata processor 303 analyzes a zoom magnification of the camera 200 and the metadata received from the communicator 205 of the camera 200. The metadata processor 303 may calculate sizes (widths and heights) and center coordinates (X, Y) of the objects from coordinates of the objects included in the metadata. The metadata processor 303 may calculate vector information about the objects from variations of the coordinates of the objects, that is, the center coordinates of the objects. The vector information may include travel distances, travel directions, and velocities of the objects. Hereinafter, the sizes and vector information of the objects will be referred to as movement information of the objects.

For example, the metadata processor 303 may calculate an x-axis travel distance, a y-axis travel distance, and a travel direction of an object from a previous coordinate and a current coordinate of the object. For example, vector information may be extracted from a first center coordinate (X1, Y1) and a second center coordinate (X2, Y2) of an object input with a predetermined time interval therebetween. In this case, the x-axis travel distance of the object is (X2-X1), and the travel direction of the object may be determined to be a forward direction if the x-axis travel distance is greater than 0, and a reverse direction if the x-axis travel distance is less than 0. Similarly, the y-axis travel distance of the object is (Y2-Y1), and the travel direction of the object may be determined to be a forward direction if the y-axis travel distance is greater than 0, and a reverse direction if the y-axis travel distance is less than 0.

In addition, the metadata processor 303 may calculate velocity of each object. The velocity of each object may vary according to the travel distance of the object and a set zoom magnification. The velocity of each object may increase in proportion to the travel distance of the object, and may decrease as much as the decreased amount of angle of view of the camera 200 if the zoom magnification of the camera 200 is increased.

In addition, if the camera 200 makes both panning and tilting motions, the metadata processor 303 may calculate the vector information by an x-axis and y-axis interpolation method for synchronization.

The metadata processor 303 may select a target object from among the objects based on the sizes of objects. A predetermined portion of a vertical or horizontal length of an image may be set as a target object selection reference. If at least one of the horizontal length (width) and the vertical length (height) of an object corresponds to the target object selection reference, the metadata processor 303 may select the object as a target object. The width of the object may be calculated from a difference between x-axis coordinates of an upper-left end and a lower-right end of the object. The height of the object may be calculated from a difference between y-axis coordinates of the upper-left end and the lower-right end of the object. For example, if an object having a vertical length (height) equal to ¼, ½, or ¾ of the vertical length of images is detected as continuously moving for a certain time period (for example, ten image frames), the metadata processor 303 may select the object as a target object. The target object selection reference is not limited to the above-mentioned values.

The metadata processor 303 may control panning/tilting/zooming of the camera 200 through the motor controller 305 to prevent the target object from moving out of the angle of view of the camera 200. The metadata processor 303 may calculate amounts of panning/tilting/zooming of the camera 200 such that the center coordinate of the target object may be positioned at a center of each image.

The metadata processor 303 may set a first region (imaginary region) in a first image captured by the camera 200 directed in a first direction. The first region is set based on a center of the first image and defines boundaries of panning/tilting of the camera 200. The first region may be adjusted according to a user's setting or features of the target object (such as a kind or velocity of the target object). If the target object moves to the outside of the first region from the center of the first image, the metadata processor 303 may calculate amounts of panning and tilting motions of the camera 200 for moving the camera 200 in a second direction. The second direction is a direction in which if a second image is captured, the target object is located at a center of the second image. The metadata processor 303 may calculate an amount of zooming of the camera 200 that allows the size of the target object located at the center of the second image to be equal to the size of the target object when the target object is located at the center of the first image. The metadata processor 303 may transmit the calculated amount of zooming to the camera 200 through the communicator 301.

The metadata processor 303 may set a second region (imaginary region) for the target object. The second region is a movable range of the target object determined in consideration of the velocity of the target object. The metadata processor 303 may filter out other objects located outside the movable range of the target object by analyzing only metadata of the second region while leaving out metadata of a region outside the second region.

If the target object departs from the first region, the metadata processor 303 may recognize and track the target object by comparing results of analysis on previous metadata of the target object with results of analysis on current metadata of other objects. If the center coordinate of the target object is outside the first region, it may be determined that the target object is outside the first region. The metadata processor 303 may recognize the target object by comparing the size, travel distance, and travel direction of the target object with the sizes, travel distances, and travel directions of other objects. In this case, the metadata processor 303 may compare all or some of the size, travel distance, and travel direction of the target object with those of other objects. For example, the metadata processor 303 may first compare the size of the target object with the size of another object, and if the size of the target object is equal to the size of the other object, the metadata processor 303 may compare the travel distance of the target object with the travel distance of the object. In addition, if the travel distance of the target object is equal to the travel distance of the other object, the metadata processor 303 may compare the travel direction of the target object with the travel direction of the object.

If other objects are located in the second region of the target object, the metadata processor 303 may recognize and track the target object by comparing results of analysis on previous metadata of the target object with results of analysis on current metadata of the other objects.

The motor controller 305 may generate a motor control signal to control the panning/tilting motor 400 based on the amounts of panning and tilting motions of the camera 200. The motor controller 305 may convert the amounts of panning and tilting motions of the camera 200 into a pulse signal in consideration of conditions such as object movement information and a motor step angle, gear ratio, and micro-stepping of the camera system 120.

The panning/tilting motor 400 may include a panning motor and a tilting motor, and each of the panning motor and the tilting motor may be disposed in the first housing or the second housing. Each of the panning motor and the tilting motor may be a step motor or a pulse motor. The panning motor may rotate the camera 200 to the left or right according to a panning motor driving pulse signal, and the tilting motor may tilt the camera 200 in a vertical direction according to a tilting motor driving signal. The panning motor and the tilting motor may be individually or simultaneously controlled.

Figure 3A:
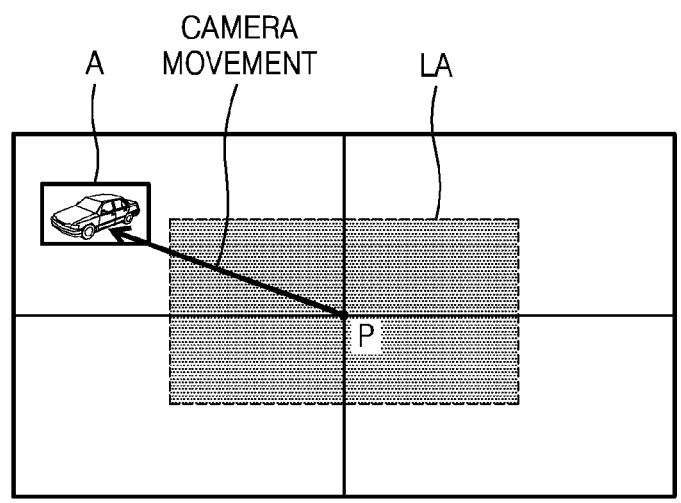
FIGS. 3A and 3B are views illustrating how an imaginary region is set for tracking a target according to an exemplary embodiment.
Figure 3B:
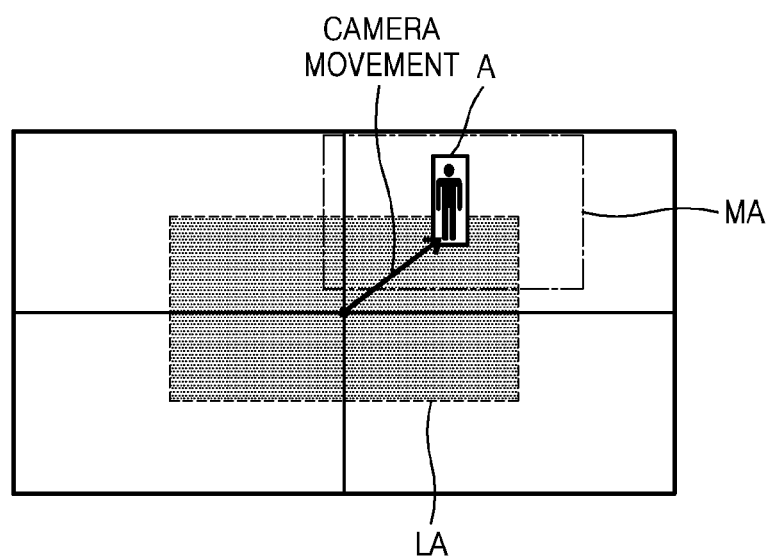

FIGS. 3A and 3B are views illustrating how an imaginary region is set for tracking a target object, according to an exemplary embodiment.

Referring to FIG. 3A, the metadata processor 303 may set a first region (imaginary region) LA in an image. If a target object A departs from the first region LA, the metadata processor 303 calculates a panning/tilting amount for the camera 200, and the motor controller 305 generates a panning/tilting control signal for moving the camera 200. In this way, the target object A may be located at a center P of an image, e.g., a next image. After the camera 200 is panned/tilted, the metadata processor 303 may control the zoom magnification of the camera 200 to adjust the target object A to have a same size in an image before and after the camera 200 is panned/tilted.

Referring to FIG. 3B, the metadata processor 303 may set a first region (imaginary region) LA in an image and a second region (imaginary region) MA for a target object A. If the target object A departs from the first region LA, the metadata processor 303 calculates a panning/tilting amount for the camera 200, and the motor controller 305 generates a panning/tilting control signal for moving the camera 200. In this manner, the target object A may be located to a center P of an image, e.g., a next image. After the camera 200 is panned/tilted, the metadata processor 303 may control the zoom magnification of the camera 200 to adjust the target object A to have a same size in an image before and after the camera 200 is panned/tilted. The metadata processor 303 may only use metadata of the second region MA to prevent errors that may occur when another object existing outside the second region MA is recognized as the target object A and tracked.

Figure 4A:
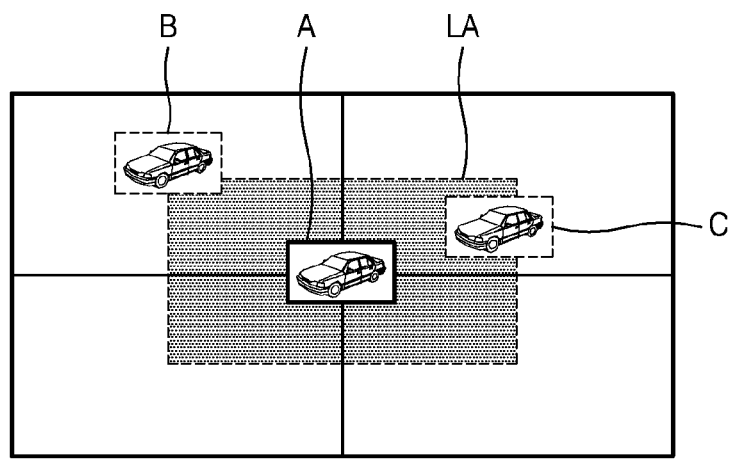
FIGS. 4A and 4B are views illustrating a method of tracking an object using the camera apparatus according to an exemplary embodiment.
Figure 4B:
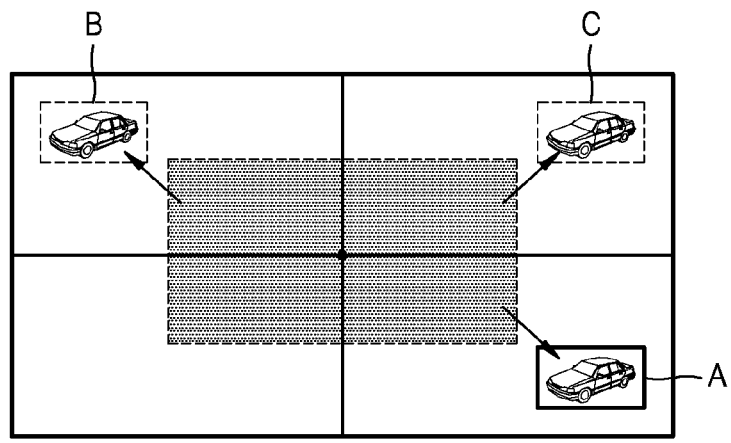

FIGS. 4A and 4B are views illustrating a method of tracking an object using the camera system 120, according to an exemplary embodiment.

The camera controller 300 receives metadata about a plurality of objects A, B, and C from the camera 200. The camera controller 300 analyzes the metadata about the plurality of objects A, B and C. The camera controller 300 may select the object A from among the plurality of objects A, B and C as a target object according to a target object selection reference. As shown in FIG. 4A, the camera controller 300 controls panning/tilting/zooming of the camera 200 such that the target object A selected from among the plurality of objects A, B, and C may be located at a center P of an image.

The camera controller 300 transmits a zooming amount to the camera 200, and generates a posture control value corresponding to a panning/tilting amount of the camera 200. The panning/tilting motor 400 pans and tilts the camera 200 according to the posture control value. The zoom lens and the focus lens of the camera 200 are adjusted according to the zooming amount such that the size of the target object A may be maintained to be the same in an image before and after the camera 200 is panned/tilted.

The camera 200 is fixed without panning/tilting/zooming while the target object A exists within a first region LA. That is, the camera 200 may capture images of a front field at a fixed posture, and may generate metadata about the plurality of objects A, B and C from the captured images, and the camera controller 300 may analyze the metadata received from the camera 200 to obtain movement information about each of the plurality of objects A, B and C, and may store the movement information in a memory (not shown).

If the target object A departs from the first region LA as shown in FIG. 4B, the camera 200 is panned/tilted to a new posture according to a panning/tilting/zooming control signal of the camera controller 300. The camera controller 300 may recognize and track the target object A among the plurality of objects A, B and C located outside the first region LA based on movement information (size and vector information) about the target object A obtained while the target object A was located in the first region LA, particularly, movement information about the target object A obtained just before the target object A departed from the first region LA. The camera controller 300 may select metadata of the target object A from among metadata of the plurality of objects A, B and C transmitted in real time to the camera controller 300, based on movement information about the target object A obtained while the target object A was located in the first region LA. For example, based on a travel distance and travel direction of the target object A obtained while the target object A was located in the first region LA, the camera controller 300 may predict a next travel distance and travel direction of the target object A, and may analyze metadata received from the camera 200 to select some of metadata that is closest to the size and the predicted travel distance and direction of the target object A.

In the following description, detailed descriptions of configurations and elements already given above will not be repeated here below.

Figure 5:
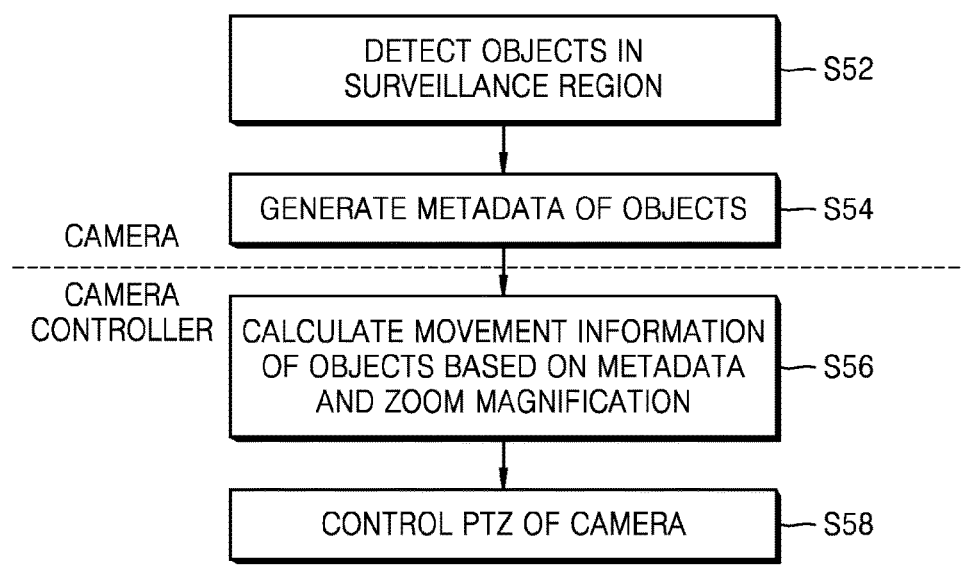
FIG. 5 is a flowchart illustrating a method of controlling the posture of a camera according to an exemplary embodiment.

FIG. 5 is a flowchart illustrating a method of controlling the posture of a camera, according to an exemplary embodiment.

Referring to FIG. 5, a camera may detect at least one object from an image of a surveillance region captured by the camera directed in a current direction of the camera (S52).

The camera may generate metadata containing information about the at least one object (S54). The metadata may include the number and the coordinate of the object detected from the image. The coordinate of each object may include the coordinate of an upper-left end of an object block and the coordinate of a lower-right end of the object block. The camera may transmit the metadata of the object to a camera controller.

After receiving the metadata, the camera controller may calculate movement information about the object based on the metadata and a zoom magnification of the camera (S56). A size and a center coordinate of the object may be calculated from the coordinate of the object. Vector information may be calculated from variations of the center coordinate of the object. The movement information about the object may refer to a local movement of the object in images captured by the camera maintained at current panning/tilting/zooming (PTZ) conditions, and may include the size and vector information about the object. The vector information may include a travel distance, a travel direction, and a velocity of the object. The camera controller may select a target object based on the size and vector information about the object.

The camera controller may control PTZ of the camera based on the movement information about the object (S58). The camera controller may control the PTZ of the camera such that the selected target object may be located at a center of an image. If the target object departs from a first region of an image, the camera controller may control the PTZ of the camera such that the target object may be located at the center of an image.

Figure 6:
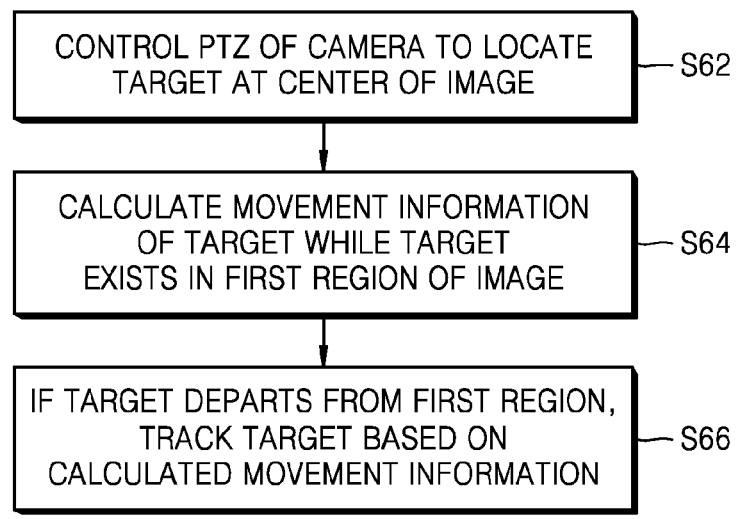
FIG. 6 is a flowchart illustrating a method of tracking an object according to an exemplary embodiment.

FIG. 6 is a flowchart illustrating a method of tracking an object, according to an exemplary embodiment.

Referring to FIG. 6, a camera controller determines posture control values and a zoom magnification for a camera, and controls PTZ of the camera according to the posture control values and the zoom magnification such that a selected target object may be located at a center of an image.

The camera controller may set a first region in each image captured by the camera maintained at the current PTZ state, and may analyze metadata of a target object transmitted from the camera while the target object is located within he first region to calculate movement information about the target object (S64).

If the target object departs from the first region, the camera controller may track the target object based on the calculated movement information (S66). The camera controller may recognize the target object among a plurality of objects existing outside the first region based on the movement information about the target object calculated while the target object was in the first region. The camera controller may recognize the target object among a plurality of objects by comparing a size, a travel distance and/or a travel direction of the target object with sizes, travel distances and/or travel directions of other objects in a predetermined order. The camera controller determines posture control values and a zoom magnification for the camera, and controls the PTZ of the camera according to the posture control values and the zoom magnification such that the recognized target object may be located at a center of an image. The size of the target object may be maintained to be the same before and after the camera is panned and tilted by controlling zooming of the camera.

FIGS. 7A to 7F are views illustrating a method of tracking an object using the camera array 100, according to another exemplary embodiment.

Figure 7A:
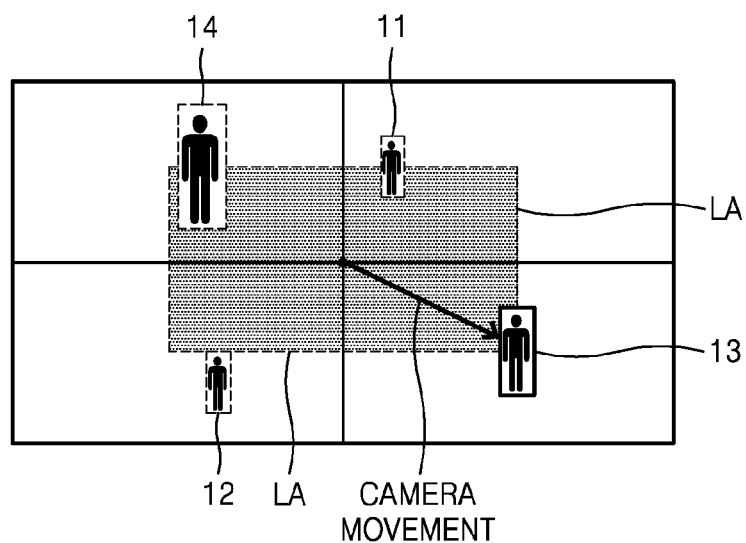
FIGS. 7A to 7F are views illustrating a method of tracking an object using a camera system according to another exemplary embodiment.

Referring to FIG. 7A, the camera controller 300 receives metadata about a plurality of objects 11 to 14 detected in a surveillance region by the camera 200. The camera controller 300 sets a first region (imaginary region) LA in an image corresponding to a current angle of view of the camera 200.

The camera controller 300 may select an object of the plurality of objects 11 to 14 as a target object if the objet has a preset size. For example, an object having a size corresponding to a predetermined portion of a horizontal or vertical length of the image may be selected as a target object. In FIG. 7A, the object 13 is selected as a target object.

Figure 7B:
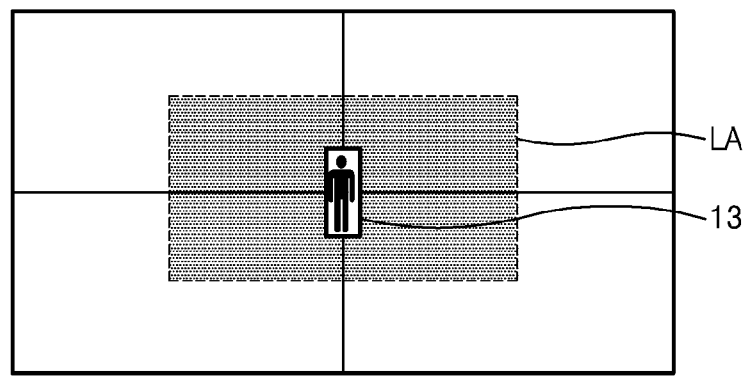

Referring to FIG. 7B, the camera controller 300 controls panning/tilting of the camera 200 such that the object (target object) 13 may be located at a center of an image. The camera controller 300 generates a posture control value corresponding to a panning/tilting amount of the camera 200. The panning/tilting motor 400 pans and tilts the camera 200 according to the posture control value. The camera controller 300 controls zooming of the camera 200 to determine a size of the target object 13 in the image.

The camera controller 300 calculates the size and center coordinate of the target object 13 by analyzing metadata about the target object 13 moving within first regions LA of images captured by the camera 200 without varying PTZ of the camera 200. The camera controller 300 may calculate the size and vector information about the target object 13 from the current and previous coordinates of the target object 13. The vector information includes a velocity, a travel direction, and a travel distance of the target object 13.

Figure 7C:
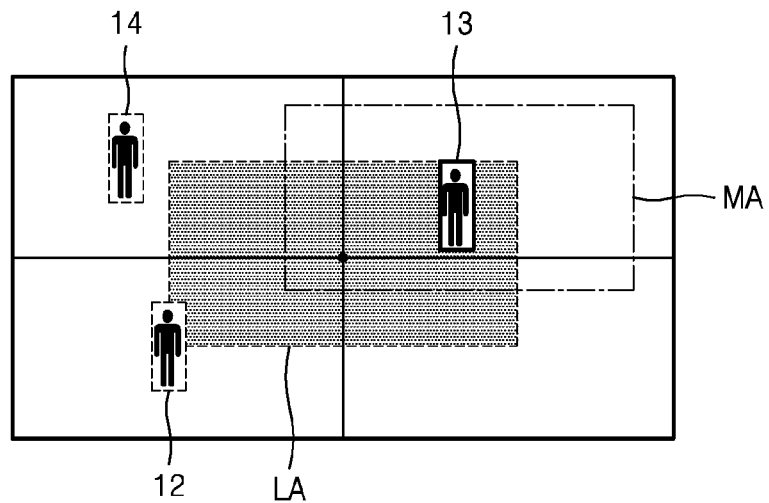

The camera controller 300 may set a second region MA for the target object 13 in consideration of the velocity and travel direction of the target object 13. The faster the velocity of the target object 13 is, the larger the second region MA is, and the lower the velocity of the target object 13 is, the smaller the second region MA is. Since the second region MA is set, disturbances by environmental agents or other objects may be filtered out. Referring to FIG. 7C, since the second region MA is set for the target object 13, the background and other objects 12 and 14 existing outside the second region MA may be filtered out.

Figure 7D:
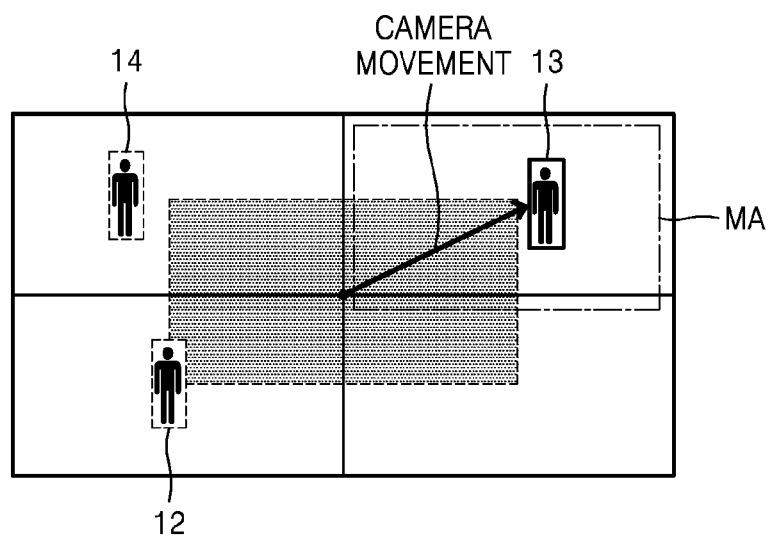

If the target object A departs from the first region LA as shown in FIG. 7D, the camera controller 300 may change a posture of the camera 200 by controlling a panning/tilting motion of the camera 200 such that the target object 13 may return to a center of an image. If the target object 13 looks larger or smaller due to a movement, the camera 200 zooms in or out under control of the camera controller 300 such that the target object 13 may have a same size as the size of the target object 13 when selected as a target object.

Figure 7E:
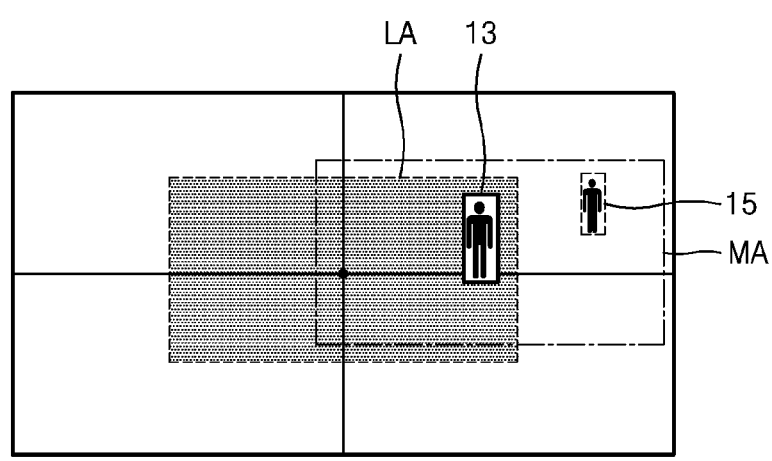

Referring to FIG. 7E, if a plurality of objects exist in the second region MA set for the target object 13, the camera controller 300 may recognize the target object 13 among the plurality of objects by comparing the size and vector information about the target object 13 that is continuously monitored with the size and vector information about the plurality of objects, thereby tracking the target object 13 without missing the target object 13. Even when the target object 13 departs from the first region LA and a plurality of objects exist outside the first region LA (this situation is not shown), the camera controller 300 may recognize the target object 13 among the plurality of objects by comparing the size and vector information about the target object 13 that is continuously monitored with the size and vector information about the plurality of objects, thereby tracking the target object 13 without missing the target object 13.

Figure 7F:
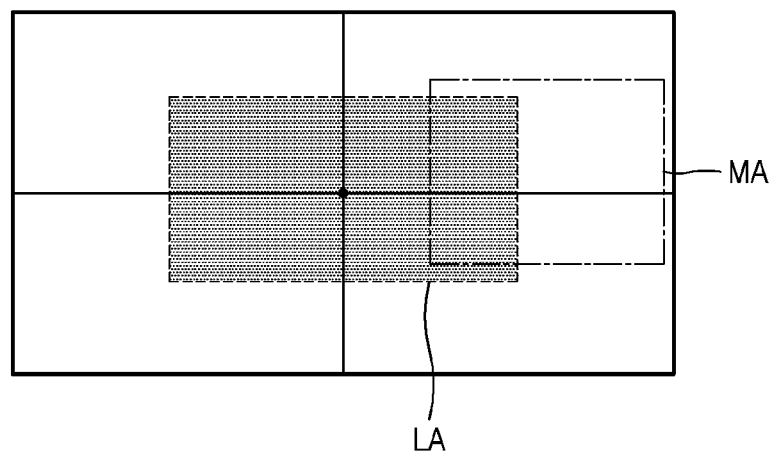

Referring to FIG. 7F, if the target object 13 is missed, the camera controller 300 controls panning/tilting of the camera 200 to point the camera 200 to the last position of the target object 13. The camera controller 300 generates a posture control value corresponding to a panning/tilting amount of the camera 200. The panning/tilting motor 400 pans and tilts the camera 200 according to the posture control value. In addition, the camera controller 300 zooms out the camera 200 and restarts detecting of the target object 13.

Figure 8:
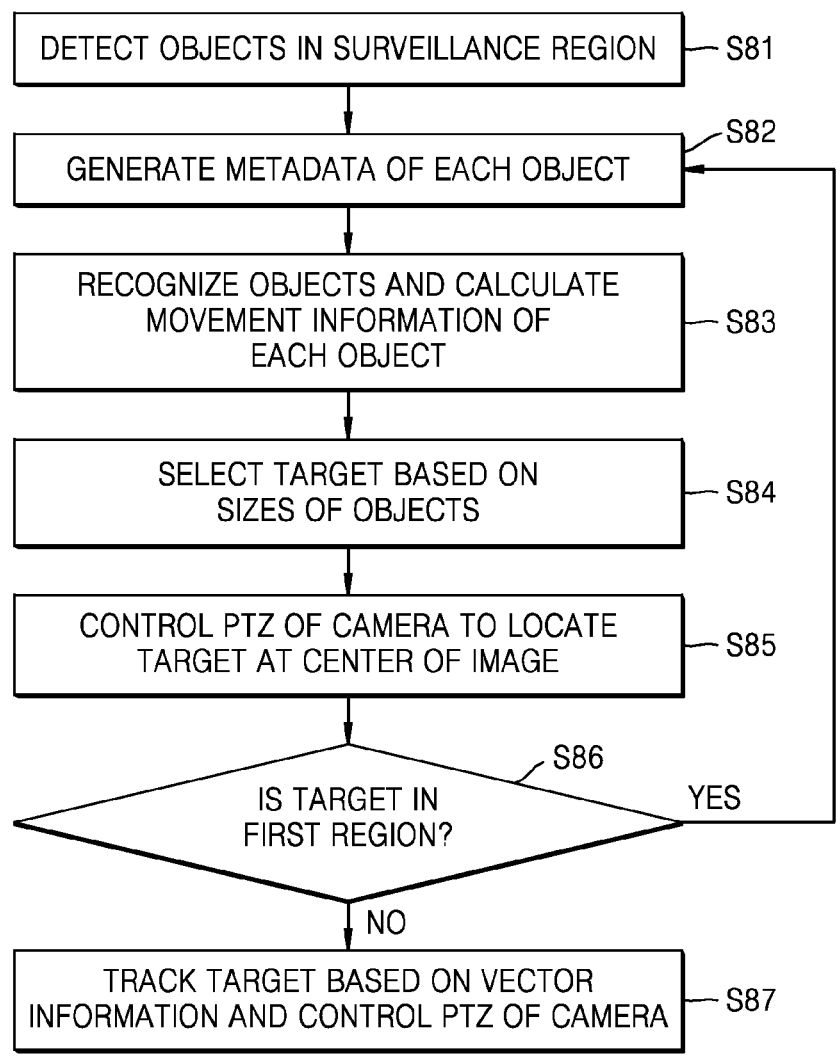
FIG. 8 is a flowchart illustrating a method of tracking an object according to another exemplary embodiment.

FIG. 8 is a flowchart illustrating a method of tracking an object, according to another exemplary embodiment.

Referring to FIG. 8, a camera may detect at least one object from an image captured by the camera directed in the current direction of the camera (S81).

The camera may generate metadata containing information about the object (S82). The metadata may include information about a coordinate of the object.

A camera controller may receive the metadata and recognize the object, and may calculate movement information about each object. The movement information may refer to a local movement of the object in images captured by the camera maintained at a current PTZ state, and may include information about size and vector information about the object. A size and a center coordinate of the object may be calculated from the a coordinate of the object. The vector information may be calculated from variations of the center coordinate of the object. The vector information may include a travel distance, a travel direction, and velocity of each object.

The camera controller may select a target object based on the size of the at least one object (S84). A certain portion of a vertical length or a horizontal length of an image may be set as a target object selection reference.

The camera controller may control PTZ of the camera such that the selected target object may be located at a center of an image (S85). The camera controller may set a first region in each image.

The camera controller may determine whether the target object departs from the first region (S86). If it is determined that the target object departs from the first region, the camera controller may track the target object using the vector information about the target object, and may control PTZ of the camera such that the target object may be located at a center of an image (S87). The camera controller may recognize the target object among a plurality of objects existing outside the first region by comparing at least one of a size, a travel distance, and/or a travel direction of the target object which are previously calculated with sizes, travel distances, and/or travel directions of the objects, respectively, in a predetermined order.

The camera controller may set a second region. The camera controller may only use metadata of the second region for filtering out objects existing outside a moving range of the target object. If other objects exist inside the second region set for the target object, the camera controller may distinguish the target object from the other objects by comparing the size, the travel distance, and/or the travel direction of the target object with the sizes, the travel distances, and the travel directions of the other objects, respectively, in a predetermined order.

Figure 9:
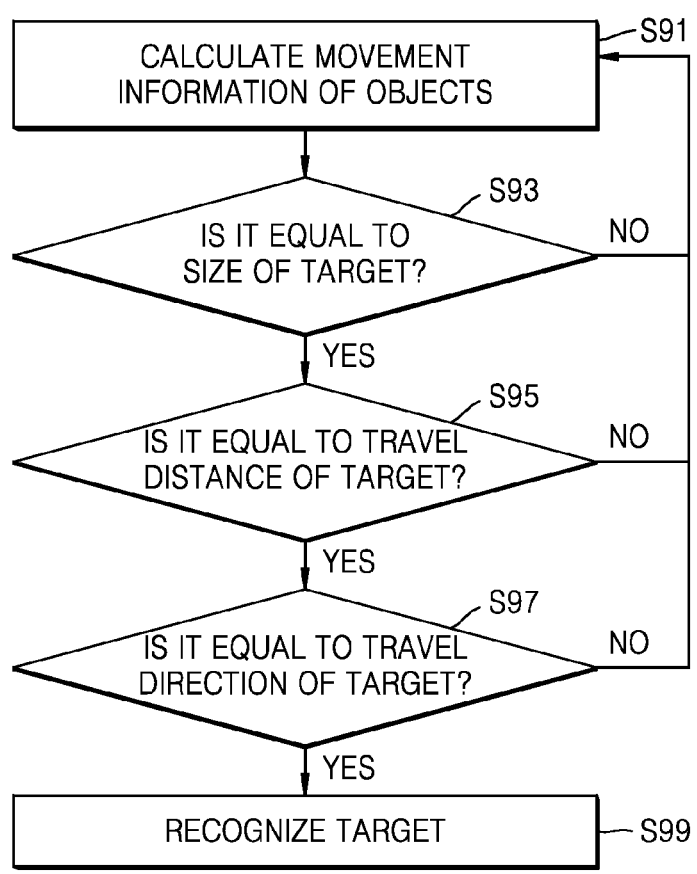
FIG. 9 is a flowchart illustrating a method of recognizing an object according to an exemplary embodiment.

FIG. 9 is a flowchart illustrating a method of recognizing an object, according to an exemplary embodiment.

If a target object departs from a first region and a plurality of other objects exist outside the first region, or if a plurality of other object exists within a second region set for the target object, a camera controller may recognize the target object by comparing movement information about the target object with movement information about the other objects.

Referring to FIG. 9, the camera controller may analyze metadata of each object received from a camera and generate movement information about each object (S91).

The camera controller compares a size of the target object with the sizes of the other objects (S93). If the size of the target object is equal to the size of another object, the camera controller compares the travel distance of the target object with the travel distance of the other object (S95). If the travel distance of the target object is equal to the travel distance of the object, the camera controller compares the travel direction of the target object with the travel direction of the other object (S97).

In this way, if the camera controller finds an object having the same size, travel distance, and travel direction as those of the target object, the camera controller may recognize the object as the target object (S99). That is, the camera controller may filter out each object if at least one of the size, travel distance, and travel direction of the object is different from that of the target object.

As described above, according to the above exemplary embodiments, the camera system may track an object by using only metadata of objects without analyzing images using DSP, thereby reducing costs and making it possible to continuously track a moving object.

The method of controlling the posture of a camera and the method of tracking an object described according to the exemplary embodiments may be embodied as computer readable codes on a computer readable recording medium. The methods can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage. The computer readable recording medium can also be distributed over network coupled computer systems so that the computer readable code is stored and executed in a distributed fashion. Also, functional programs, codes, and code segments for accomplishing the methods can be easily construed by programmers skilled in the related art.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A camera system comprising:
   a camera configured to detect at least one object in a surveillance region of which an image is captured by the camera directed in a first direction, and generate metadata of the at least one object based on a result of detection of the at least one object; and
   a camera controller configured to control at least one of panning, tilting and zooming of the camera based on the metadata of a target object selected from among the at least one object,
   wherein the camera controller is further configured to:
      set a first region in the image captured by the camera directed in the first direction based on a center of the image, the first region defining boundaries of the panning and the tilting of the camera; and
      set a second region in the image captured by the camera directed in the first direction, the second region indicating a movable range of the target object which is determined to currently move within the first region,
   wherein the camera controller is configured to set the second region to have a size and a direction with respect to the center of the image that are variable according to a velocity and a movement direction of the target object, the second region having a larger size in response to a higher velocity of the target object and having a smaller size in response to a lower velocity of the target object, and wherein, when the target object departs from the first region, the camera controller is configured to control at least one of panning and tilting of the camera to direct the camera in a second direction toward the target object, based on metadata of the target object, obtained based on a result of detection, by the camera directed in the first direction, of the target object within the second region and excluding metadata obtained in a region outside of the second region, wherein the camera controller is configured to control the at least one of panning and tilting of the camera with respect to the target object among the at least one object by comparing size and vector information about the target object with size and vector information about another object among the at least one object.

2. The camera system of claim 1, wherein the metadata comprises a coordinate of the at least one object.

3. The camera system of claim 2, wherein the camera controller is configured to calculate a size and a center coordinate of the at least one object from the metadata generated by the camera while the camera is maintained in the first direction without being moved, and wherein the camera controller is configured to calculate vector information about the at least one object from variations of the center coordinate of the at least one object.

4. The camera system of claim 3, wherein the vector information comprises a travel distance, a travel direction, and a velocity of the at least one object.

5. The camera system of claim 1, wherein the camera controller is configured to select one of the at least one object having a preset size as the target object.

6. The camera system of claim 1, wherein the camera controller is configured to control zooming of the camera such that a size of the target object in an image captured by the camera directed in the second direction is equal to a size of the target object in the image captured by the camera directed in the first direction.

7. The camera system of claim 1, wherein the camera controller is configured to control the at least one of panning and tilting of the camera with respect to the target object among the target object and another object existing in the second region other than the target object by comparing size and vector information about the other object with size and vector information about the target object.

8. A method of tracking an object using a camera, the method comprising:
generating metadata about at least one object using the camera based on a result of detection of the at least one object, the at least one object being detected in a surveillance region of which an image is captured by the camera directed in a first direction;
selecting a target object from among the at least one object based on the metadata analyzed by a camera controller; and
generating a control signal based on the metadata of the target object to control at least one of panning, tilting and zooming of the camera,
wherein the generating the control signal comprises:
setting a first region in the image captured by the camera directed in the first direction based on a center of the image, the first region defining boundaries of the panning and the tilting of the camera; and
setting a second region in the image captured by the camera directed in the first direction, the second region indicating a movable range of the target object which is determined to currently move within the first region, wherein the second region is set to have a size and a direction with respect to the center of the image that are variable according to a velocity and a movement direction of the target object, the second region having a larger size in response to a higher velocity of the target object and having a smaller size in response to a lower velocity of the target object, and when the target object departs from the first region, generating the control signal to control at least one of panning and tilting of the camera to direct the camera in a second direction toward the target object, based on metadata of the target object, obtained based on a result of detection, by the camera directed in the first direction, of the target object within the second region and excluding metadata obtained in a region outside of the second region, wherein the generating the control signal further comprises generating the control signal to control the at least one of panning and tilting of the camera with respect to the target object among the at least one object by comparing size and vector information about the target object with size and vector information about another object among the at least one object.

9. The method of claim 8, wherein the metadata comprises a coordinate of the at least one object.

10. The method of claim 9, wherein the generating the control signal further comprises:
calculating a size and a center coordinate of the at least one object from the metadata generated by the camera while the camera is maintained in the first direction without being moved; and
calculating vector information about the at least one object from variations of the center coordinate of the at least one object.

11. The method of claim 10, wherein the vector information comprises a travel distance, a travel direction, and a velocity of the at least one object.

12. The method of claim 8, wherein the selecting the target object comprises selecting one of the at least one object having a preset size as the target object.

13. The method of claim 8, wherein the generating the control signal further comprises generating the control signal to control zooming of the camera such that a size of the target object in an image captured by the camera directed in the second direction is equal to a size of the target object in the image captured by the camera directed in the first direction.

14. The method of claim 8, wherein the generating the control signal further comprises generating the control signal to control the at least one of panning and tilting of the camera with respect to the target object among the target object and another object existing in the second region other than the target object by comparing size and vector information about the target object with size and vector information about the other object.

15. A camera system comprising:
a camera configured to detect, from an image, a local movement of a target object, selected from among at least one object, within a first region while the camera is directed in one direction without any movement, and generate metadata based on the detected local movement of the target object, the first region being set based on a center of the image and defining boundaries of panning and tilting of the camera; and a camera controller configured to control at least one of the panning, the tilting and zooming of the camera based on the metadata of the target object, wherein the camera controller is further configured to set a second region in the image captured by the camera directed in the one direction, the second region indicating a movable range of the target object which is determined to currently move within the first region, wherein the camera controller is configured to set the second region to have a size and a direction with respect to the center of the image that are variable according to a velocity and a movement direction of the target object, the second region having a larger size in response to a higher velocity of the target object and having a smaller size in response to a lower velocity of the target object, wherein, when the target object departs from the first region, the camera controller is configured to control at least one of panning and tilting of the camera to direct the camera, controlling the at least one of the panning and the tilting being based on metadata of the target object, obtained based on a result of detection, by the camera directed in the one direction, of the target object within the second region and excluding metadata obtained in a region outside of the second region, and wherein the camera controller is configured to control the at least one of panning and tilting of the camera with respect to the target object among the at least one object by comparing size and vector information about the target object with size and vector information about another object among the at least one object.

16. The camera system of claim 15, wherein the local movement is detected by comparing the image captured by the camera with a reference image.

17. The camera system of claim 16, wherein the camera detects the local movement without moving the camera by any of panning, tilting and zooming operations.

18. The camera system of claim 1, wherein, in response to one or more second objects different from the target object being located in the second region, the camera controller is configured to determine the target object by comparing results of analysis on previous metadata of the target object in the first region with results of analysis on current metadata of the one or more second objects in the second region.

* * * * *